(12) United States Patent
Tanaka

(10) Patent No.: US 9,590,819 B2
(45) Date of Patent: Mar. 7, 2017

(54) STOPPING POLLING OF A PERIPHERAL DEVICE ON A NETWORK IF THE PERIPHERAL DEVICE LEAVES THE NETWORK

(71) Applicant: CANON KABUSHIKI KAISHA, Tokyo (JP)

(72) Inventor: Yuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/509,409

(22) Filed: Oct. 8, 2014

(65) Prior Publication Data

US 2015/0109636 A1    Apr. 23, 2015

(30) Foreign Application Priority Data

Oct. 23, 2013   (JP) .................................. 2013-220481

(51) Int. Cl.
*H04L 12/403* (2006.01)
*G06F 13/22* (2006.01)
*G06F 3/12* (2006.01)
*H04N 1/00* (2006.01)

(52) U.S. Cl.
CPC ....... *H04L 12/403* (2013.01); *H04N 1/00344* (2013.01); *H04N 1/00925* (2013.01); *H04N 2201/0072* (2013.01); *H04N 2201/0094* (2013.01)

(58) Field of Classification Search
CPC ... H04N 1/32032; G06F 3/1294; G06F 13/22; H04L 12/403
USPC ............................................. 358/1.15; 399/8
See application file for complete search history.

(56) References Cited

U.S. PATENT DOCUMENTS

| | | | | |
|---|---|---|---|---|
| 4,266,271 A | * | 5/1981 | Chamoff | G06F 3/0227 709/209 |
| 2008/0095130 A1 | * | 4/2008 | Puri | H04W 48/14 370/342 |
| 2008/0275974 A1 | * | 11/2008 | Rackiewicz | H04L 67/306 709/223 |
| 2014/0160525 A1 | * | 6/2014 | Kikuchi | G06F 3/1221 358/1.15 |

FOREIGN PATENT DOCUMENTS

JP    11-355481 A    12/1999

\* cited by examiner

*Primary Examiner* — Eric A Rust
(74) *Attorney, Agent, or Firm* — Fitzpatrick, Cella, Harper & Scinto

(57) ABSTRACT

When the communication environment of an information processing apparatus is not a communication environment for polling a peripheral apparatus, polling performed on the peripheral apparatus by the information processing apparatus is stopped.

18 Claims, 8 Drawing Sheets

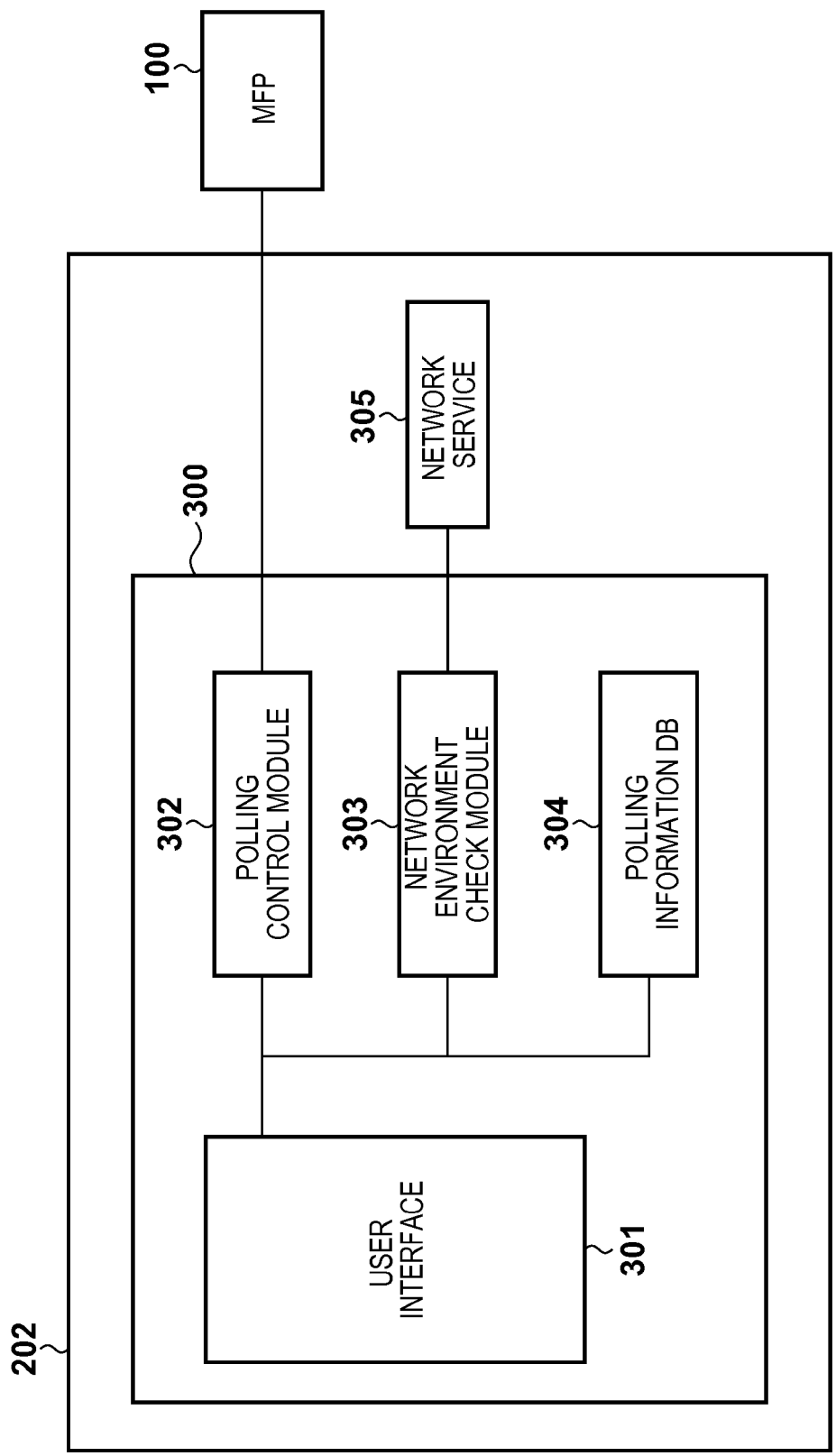

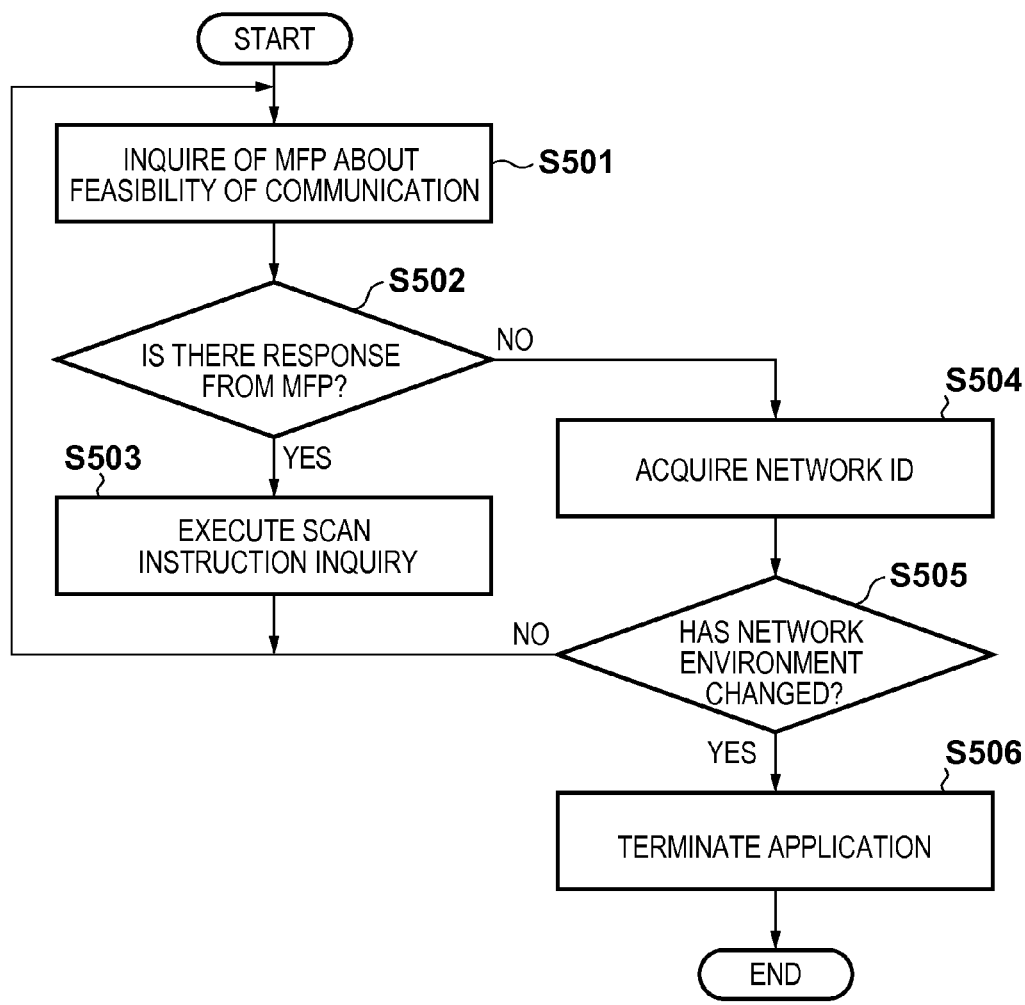

F I G. 8
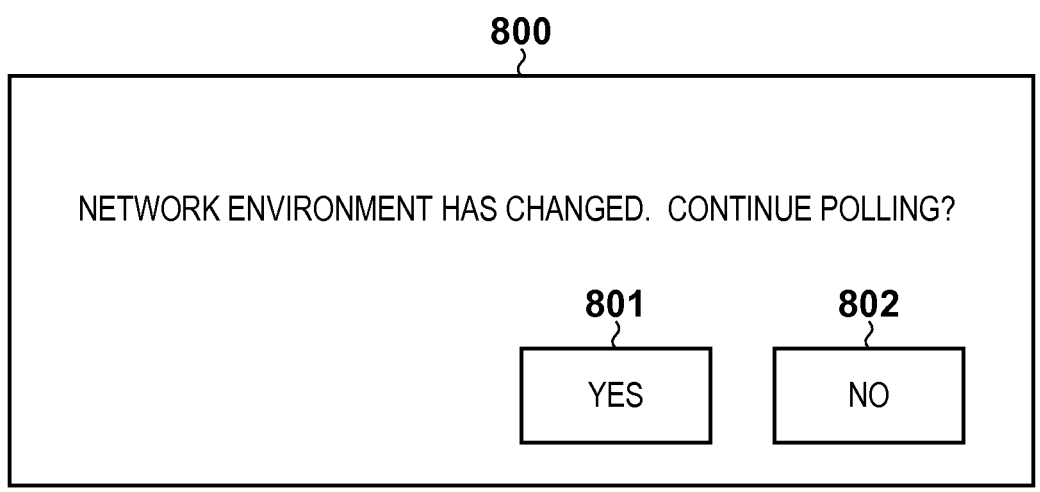

STOPPING POLLING OF A PERIPHERAL DEVICE ON A NETWORK IF THE PERIPHERAL DEVICE LEAVES THE NETWORK

BACKGROUND OF THE INVENTION

Field of the Invention

The present invention relates to an information processing technique of communicating with a peripheral apparatus across a network.

Description of the Related Art

As a method by which an information processing apparatus acquires the state of a peripheral apparatus connected across a network, a method in which the information processing apparatus polls the peripheral apparatus is conventionally available. That is, the information processing apparatus periodically transmits an inquiry request packet to the peripheral apparatus, thereby monitoring the state of the peripheral apparatus.

Functions implemented by the information processing apparatus by polling the peripheral apparatus include a push scan service. This push scan service herein mentioned is a function by which a scan instruction is issued by an operation on the peripheral apparatus, and the information processing apparatus detects the scan instruction from the peripheral apparatus by polling, causes the peripheral apparatus to scan an original by issuing a scan start instruction, and acquires the obtained scan data (Japanese Patent Laid-Open No. 11-355481).

In this related art, however, polling is continued even when the network connection destination of the information processing apparatus is switched from a network environment to which the peripheral apparatus is connected to another network environment. That is, polling is continued unless a polling stop instruction is issued although there is no peripheral apparatus as a polling target in the network environment. This causes an unnecessary network traffic, or makes the information processing apparatus perform unnecessary processing.

SUMMARY OF THE INVENTION

The present invention suppresses an unnecessary polling process.

To achieve the above object, an information processing apparatus according to the present invention includes the following arrangement. That is, an information processing apparatus for polling a peripheral apparatus, comprising: a determination unit configured to determine a communication environment of the information processing apparatus; and a stopping unit configured to stop polling on the peripheral apparatus if the communication environment determined by the determination unit differs from a communication environment for polling the peripheral apparatus.

The present invention can suppress an unnecessary polling process.

Further features of the present invention will become apparent from the following description of exemplary embodiments with reference to the attached drawings.

BRIEF DESCRIPTION OF THE DRAWINGS

FIG. 3 is a block diagram showing a polling application;

FIG. 4 is a view showing polling setting information;

FIG. 5 is a flowchart showing a polling process of the first embodiment;

FIG. 8 is a view showing an UI by which a user selects whether to perform polling.

DESCRIPTION OF THE EMBODIMENTS

Embodiments of the present invention will be explained in detail below with reference to the accompanying drawings.

First, an MFP (Multi Function Peripheral) as an example of a peripheral apparatus, an information processing apparatus such as a PC (Personal Computer), and a network configuration (information processing system) for connecting them, all of which are used in common in the embodiments to be explained below, will be explained.

Figure 1:
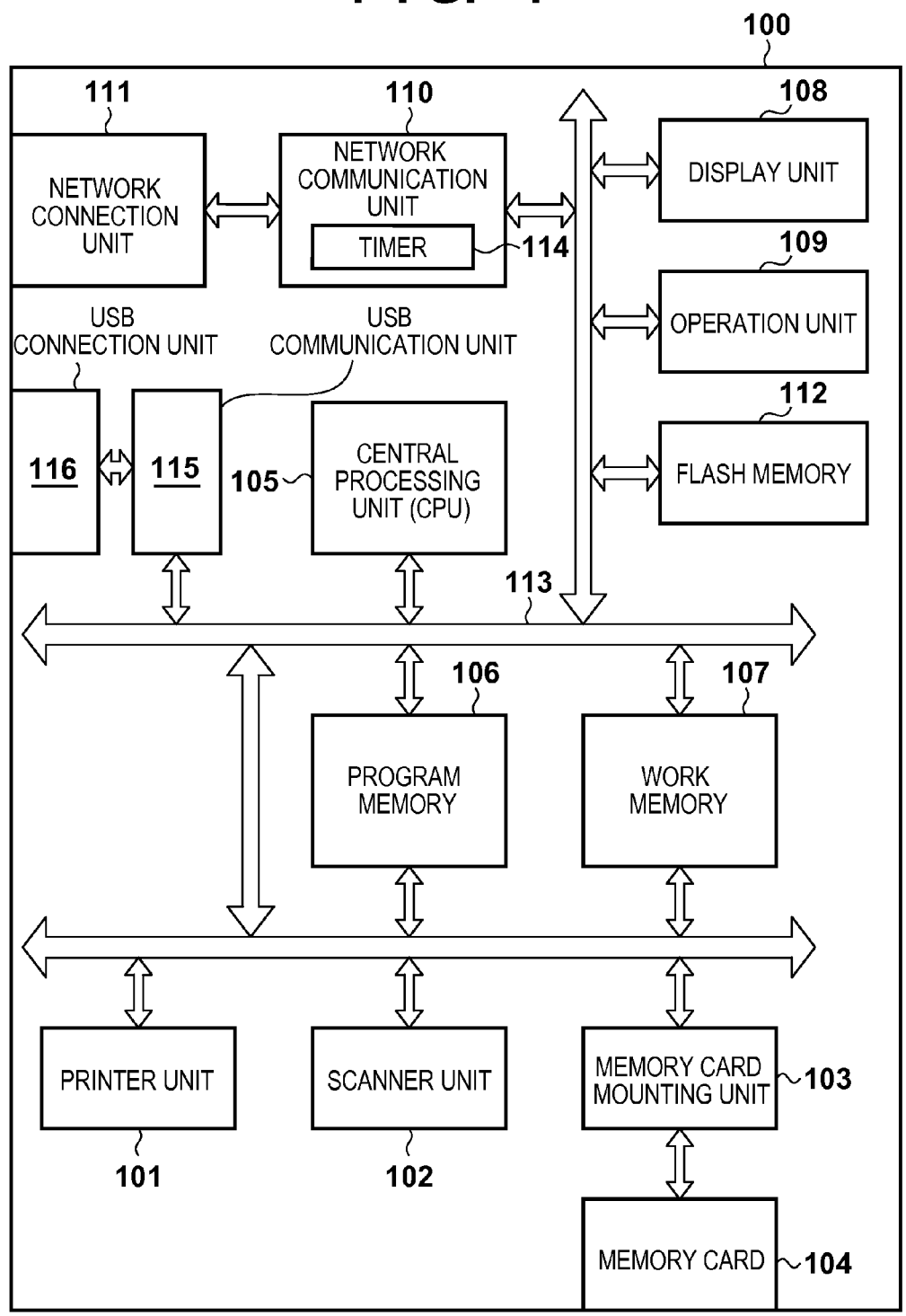
FIG. 1 is a block diagram showing an outline of the arrangement of an MFP.

FIG. 1 is a block diagram showing an outline of the arrangement of the MFP. An MFP 100 has a printer function, scanner function, copy function, and storage function, and can provide these functional services across a network.

In the MFP 100, a printer unit 101 implements the printer function. A scanner unit 102 implements the scanner function. A memory card mounting unit 103 and memory card 104 implement the storage function. The peripheral apparatus may also be a reader having only the scanner function, or a printer having only the printer function.

In the printer function, the printer unit 101 prints an image based on externally received printing data or image data stored in the memory card 104, on a printing sheet by a printing method such as an ink jet method or electrophotographic method.

In the scanner function, the scanner unit 102 converts an original set on an original table into electronic data by optically reading the original, further converts the electronic data into a designated file format, and transmits the file to an external apparatus across the network.

In the copy function, image data generated by the scanner unit 102 by reading an original placed on the original table is transferred to the printer unit 101, and the printer unit 101 prints the original data on a printing sheet.

In the storage function, an external apparatus connected across the network reads out a file stored in the memory card 104, and a file can be stored in the memory card from the external apparatus.

The MFP 100 further includes a CPU (Central Processing Unit) 105 for controlling various constituent elements of the MFP 100, and a program memory 106 such as a ROM storing data such as program codes to be read out by the CPU 105. In addition, the MFP 100 includes a work memory 107 such as a RAM for temporarily storing or buffering data such as image data when each service is executed, and a display unit 108 such as an LCD. The MFP 100 includes an operation unit 109 including various switches. When using a push scan service, the user designates an information processing apparatus as a transmission destination and issues a scan instruction from the operation unit 109. This push scan service herein mentioned is pseudo push scan by which when the information processing apparatus detects this scan instruction as an event, the information processing apparatus transmits a scan start instruction command to the MFP 100, and the MFP 100 executes a scanning process by the scanner function based on the command.

Furthermore, the MFP 100 includes a network communication unit 110 for performing various communications by connecting the MFP 100 to a network, and a network connection unit 111 for connecting the network communication unit 110 to a network medium. The network communication unit 110 corresponds to at least one of a wired LAN and wireless LAN. When the network communication unit 110 corresponds to a wired LAN, the network connection unit 111 is a connector for connecting a cable of the wired LAN to the MFP 100. When the network communication unit 110 corresponds to a wireless LAN, the network connection unit 111 is an antenna. Note that the network communication unit 110 incorporates a timer 114 for measuring time.

The MFP 100 also includes a memory 112 such as a nonvolatile flash memory for storing transmission source information of a packet received by the network communication unit 110. The MFP 100 further includes a USB (Universal Serial Bus) communication unit 115 for communicating with the information processing apparatus via a USB interface. The USB communication unit 115 is connected to the information processing apparatus by a USB connection unit 116 such as a USB connector. Various inquiries from the information processing apparatus are received as inquiry packets via the network connection unit 111 or USB connection unit 116. As a response packet to each inquiry packet, the MFP 100 returns an answer to the inquiry via the network connection unit 111 or USB connection unit 116.

Signal lines 113 interconnect the various constituent elements of the MFP 100.

Figure 2:
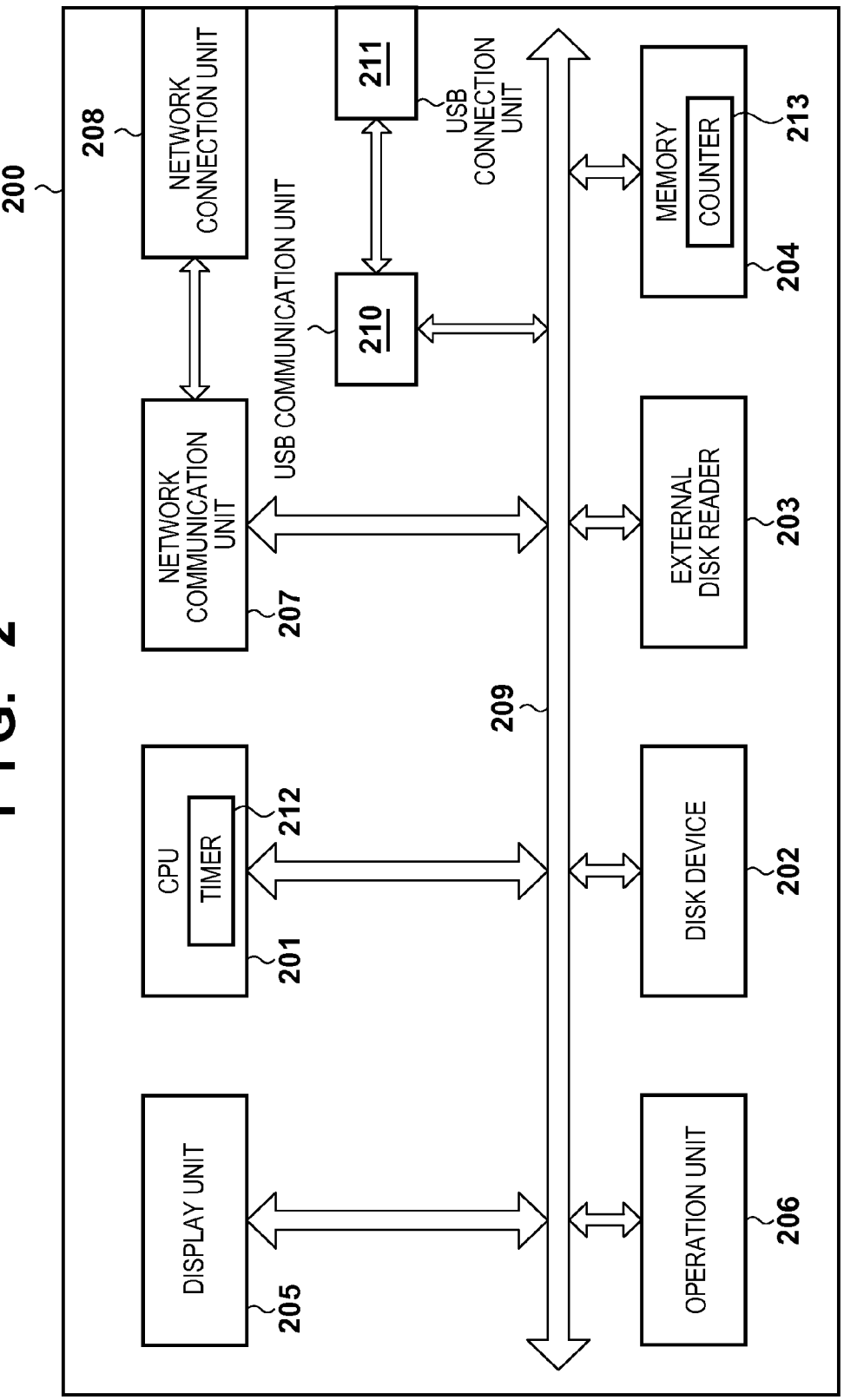
FIG. 2 is a block diagram showing an outline of the arrangement of an information processing apparatus.

FIG. 2 is a block diagram showing an outline of the arrangement of the information processing apparatus. The information processing apparatus can be implemented by, for example, installing predetermined software in a general-purpose PC.

Referring to FIG. 2, a CPU 201 controls various constituent elements of an information processing apparatus 200. The CPU 201 incorporates a timer 212 for measuring the elapse of time. Programs such as application programs to be read out by the CPU 201 and an OS (Operation System) are installed in a disk device 202, and data such as various files are also stored in it. An external disk reader 203 reads out the contents of an external storage medium such as a CD-ROM. A memory 204 is a memory in which the CPU 201 performs, for example, temporary storage and buffering of data as needed. The memory 204 incorporates a counter 213.

Various programs are installed in the information processing apparatus 200 by executing a setup program of software which allows the information processing apparatus 200 to use the MFP 100. The various programs include a scanner driver for using the scanner function and a printer driver for using the printer function. The various programs also include a polling application for inquiring the state (for example, the presence/absence of an event) of the MFP, and management software (a status monitor) for managing the status of the MFP. The polling application and management software reside in the information processing apparatus 200. The polling application periodically transmits a packet for inquiring of the MFP about the occurrence of an event, and recognizes the occurrence of a predetermined event in the MFP by referring to a response packet to the inquiry packet.

The management software periodically transmits a packet for confirming the status to the MFP, and recognizes the status of the MFP by referring to a response packet to the status confirmation packet. If it is determined based on the response packet that the status of the MFP has changed, the management software rewrites the contents of the status managed by the management software.

A display unit 205 is an internal or external display device such as an LCD, and displays various kinds of information and a GUI (Graphical User Interface). An operation unit 206 includes a keyboard, mouse, and the like, and performs various input operations. A network communication unit 207 connects the information processing apparatus 200 to the network, and performs various communications. A network connection unit 208 connects the network communication unit 207 to a network medium.

Like the MFP 100, the network communication unit 207 and network connection unit 208 correspond to at least one of a wired LAN and wireless LAN. More specifically, like the network communication unit 110 and network connection unit 111 incorporated into the MFP 100, the network communication unit 207 and network connection unit 208 take a necessary function and necessary form in accordance with the corresponding LAN. A USB communication unit 210 communicates with various peripheral apparatuses via a USB interface. A USB connection unit 211 includes a USB connector and the like, and is connected to an external apparatus.

A signal line 209 interconnects the various constituent elements of the information processing apparatus 200.

First Embodiment

The first embodiment will be explained in detail below with reference to FIGS. 3 to 6.

FIG. 3 is a block diagram for explaining the functions of a polling application 300 as software (a program) which operates on the information processing apparatus 200 and monitors the state of the MFP 100 as a peripheral apparatus. Note that the polling application 300 is stored in the disk device 202, and implements various processes shown in FIG. 5 (to be described later) when read out and executed by the CPU 201.

A user interface (UI) 301 provides various screens and control operations for operating the polling application 300. A polling control module 302 polls the state of the MFP 100 as a communication target from the information processing apparatus 200. For example, the polling control module 302 inquires the feasibility of communication, and inquires an event of a peripheral apparatus, for example, inquires whether a function execution instruction such as a scan instruction is executed. The types of events as inquiry targets are preregistered. A network environment check module 303 communicates with a network service 305 as one module of the OS, acquires a network ID as information (network environment information) indicating a network environment concerning a network (determination target network) to which the information processing apparatus 200 is presently connected, and determines a change in network environment.

The network ID as one network environment information indicates unique information for uniquely identifying the connected network. An example is GUID unique to a network, which can be acquired by Network List Manager as API (Application Program Interface) usable by Windows Vista® or Windows 7® as an OS of Microsoft®. GUID can be acquired by using the network service 305. Instead of GUID, it is also possible to use, for example, the IP address, MAC address, SSID, or access point SSID of a router used in network communication by the network communication unit 207. As described above, the network ID is identification information capable of physically identifying the network connection destination port of the information processing apparatus 200.

A polling setting information DB 304 stores information necessary for the information processing apparatus 200 to poll the MFP 100.

FIG. 4 shows a polling setting information table 400 stored in the polling setting information DB 304. An MFP name 401 is the name of each MFP connected to the information processing apparatus 200 across the network. A network ID 402 is network environment information concerning the network (used in communication) to which the information processing apparatus 200 and each MFP are connected. Thus, the polling setting information table 400 manages apparatus information (in this example, the MFP name) pertaining to a peripheral apparatus and the network ID as network environment information by associating them with each other.

As a premise of FIG. 4, when setting up, in the information processing apparatus 200, software necessary to use the MFP 100 from the information processing apparatus 200, this setup is performed in a state in which the MFP 100 and information processing apparatus 200 can communicate with each other, and the MFP name 401 and network ID 402 are set for the first time. That is, the information processing apparatus 200 specifies the MFP name 401 of the MFP 100 with which the information processing apparatus 200 communicates during setup, specifies the network ID 402 of a network environment in which the information processing apparatus 200 communicates with the MFP 100 during setup, and sets the MFP name 401 and network ID 402 by associating them with each other. Note that information of a plurality of MFPs can be registered in the polling setting information table 400.

FIG. 5 is a flowchart showing the processing of polling control which the information processing apparatus 200 performs on the MFP 100. This flowchart shows the procedure of processing performed by the CPU 201 by loading the program of the polling application 300 into the memory 204, and executing the program. Assume that processing for confirming whether a scan instruction (read instruction) is executed in the MFP 100 is performed.

In step S501, the polling control module 302 inquires of the MFP 100 about the feasibility of communication. In step S502, the polling control module 302 determines the presence/absence of a response from the MFP 100 to the inquiry. Note that the presence/absence of a response is determined by determining whether a response is returned from the MFP 100 within a predetermined time.

If it is determined that there is a response from the MFP 100 (YES in step S502), the polling control module 302 inquires in step S503 whether there is a scan instruction from the MFP 100, and returns to step S501. By taking account of an increase in network traffic or the load of the MFP 100, the process may also return to step S501 after an interval of (after waiting for) a predetermined time (for example, about 4 sec). However, this waiting time is a time which does not deteriorate the real-time properties of event detection.

On the other hand, if it is determined that there is no response from the MFP 100 (NO in step S502), the process advances to step S504, and the network environment check module 303 acquires a network ID corresponding to the network with which the information processing apparatus 200 is presently communicating via the network service 305. In this manner, the present communication environment of the information processing apparatus 200 is determined.

In step S505, the network environment module 303 compares the network ID 402 (first network environment information) which is registered in the polling setting information table 400 and corresponds to the MFP 100 as a polling destination with the network ID (second network environment information) acquired in step S504. Based on the comparison result, the network environment check module 303 determines whether the network environment of the information processing apparatus 200 has changed since the MFP 100 is registered.

If it is determined that the network IDs are different, that is, the network environment has changed (YES in step S505), the process advances to step S506, and the polling control module 302 automatically terminates the polling application 300, thereby stopping polling on the MFP 100. That is, the polling control module 302 stops polling on the MFP 100 if the communication environment of the information processing apparatus 200 is different from the communication environment for polling the MFP 100. The application to be terminated in this step is not limited to the polling application 300, and it is also possible to simultaneously terminate another application (management software or the like) which is activated to use the MFP 100.

On the other hand, if it is determined that the network IDs are the same, that is, the network environment has not changed (NO in step S505), the process returns to step S501. By taking account of an increase in network traffic or the load of the MFP 100, the process may also return to step S501 after an interval of (after waiting for) a predetermined time (for example, about 20 sec). This waiting time need not attach importance to the real-time properties when compared to event detection.

Figure 6:
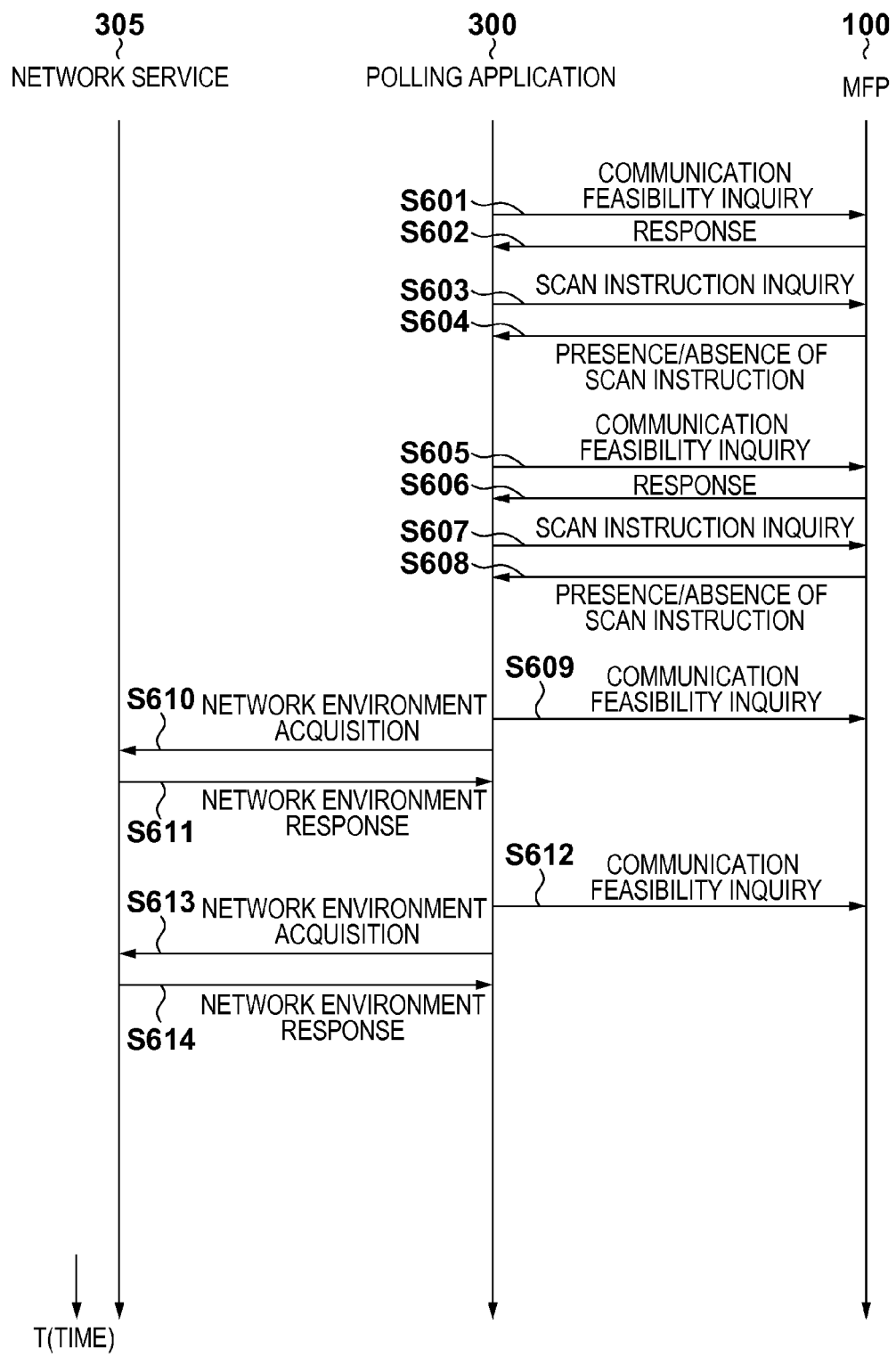
FIG. 6 is a sequence chart showing the polling process of the first embodiment.

FIG. 6 is a sequence chart showing a process in which the polling application 300 on the information processing apparatus 200 communicates with the MFP 100 across the network and acquires the network environment via the network service 305.

The polling application 300 periodically inquires of the MFP 100 about the feasibility of communication (S601, S605, and S609). This processing corresponds to step S501 in FIG. 5.

The MFP 100 receives this communication feasibility inquiry from the polling application 300, and returns a response if the response is possible (S602 and S606).

If there is a response from the MFP 100 and it is determined that communication is feasible, the polling application 300 inquires of the MFP 100 whether a scan instruction is executed (S603 and S607). This processing corresponds to step S503 in FIG. 5 after YES is determined in step S502.

The MFP 100 transmits the presence/absence of a scan instruction in response to the scan instruction inquiry from the polling application 300 (S604 and S608). If no scan instruction is executed in the MFP 100, the MFP returns a response indicating that no scan instruction is executed. The MFP 100 periodically repeats the series of processes if the MFP 100 is capable of responding to the inquiry from the polling application 300.

Assume that after S608, the MFP 100 is, for example, powered off and becomes unable to respond to the inquiry from the information processing apparatus 200 after that.

The polling application 300 inquires of the MFP 100 about the feasibility of communication (S609). Since there is no response from the MFP 100, the polling application 300 acquires information which specifies the present network environment of the information processing apparatus 200 via the network service 305 (S610).

In response to this network environment acquisition request from the polling application 300, the network service 305 notifies the polling application 300 of the present network ID (S611). This processing corresponds to step S504 in FIG. 5 after NO is determined in step S502.

The polling application 300 checks the present network environment and the network environment when the MFP 100 is registered as a polling target. That is, the polling application 300 compares the network ID 402 registered in the polling setting information table 400 with the network ID acquired in S611. Since there is no change (the network IDs are the same), the polling application 300 inquires of the MFP 100 about the feasibility of communication again (S612). This processing corresponds to the processing when NO is determined in step S505 of FIG. 5.

Assume that the network connection destination of the information processing apparatus 200 is changed after S611. For example, the user brings the information processing apparatus 200 to another place, and connects it to a different network connection destination, thereby changing the communication environment.

In this case, a communication feasibility inquiry (S612) from the polling application 300 does not reach the MFP 100. Since there is no response from the MFP 100, therefore, the polling application 300 acquires information which specifies the network environment via the network service 305 (S613). The network service 305 notifies the polling application 300 of the present network ID (S614) in response to this network environment acquisition request from the polling application 300, and the polling application 300 checks the network environment. The polling application 300 compares the network ID 402 registered in the polling setting information table 400 with the network ID acquired in S614. Since there is a change (the network IDs are different), the polling application 300 stops the periodic polling process for the MFP 100. This processing corresponds to step S506 in FIG. 5 after YES is determined in step S505.

In the first embodiment as has been explained above, when the information processing apparatus 200 is connected to a network environment (where the MFP 100 does not exist) different from a network environment in which the information processing apparatus 200 is connected to the MFP 100, useless polling is stopped. This makes it possible to suppress unnecessary network traffic, and reduce the processing load of the information processing apparatus. That is, even when the information processing apparatus can transmit a packet for polling to the network, polling is stopped if there is no peripheral apparatus as a polling target.

Also, the case in which the network environment has changed has been explained so far, but polling may also be stopped even when network communication is infeasible due to a network error. This can reduce the processing load of the information processing apparatus caused by the trial of useless polling.

Note that network polling has been described in the above embodiment, but polling may also be performed in another communication form such as a USB. That is, the same effect can be obtained by stopping polling when an environment in which the information processing apparatus communicates with an external apparatus becomes different from an environment registered as a communication form for a peripheral apparatus as a polling target.

Furthermore, when an event to be detected by polling is a scan instruction and the scanner function is executed in accordance with the instruction as in this embodiment, a peripheral apparatus can be a scanner apparatus having no printer function. In addition, an event as a polling target is not limited to the scan instruction, and may also be the presence/absence of the occurrence of an error in a peripheral apparatus, or an event in which the remaining amount of expendable supplies such as printing sheets has become equal to or smaller than a predetermined amount.

Second Embodiment

In the first embodiment, periodic polling is automatically stopped when an environment in which the information processing apparatus communicates with an external apparatus becomes different from a communication form for a peripheral apparatus as a polling target. In the second embodiment, polling is stopped when a user authorizes that. The second embodiment will be explained in detail below with reference to FIGS. 7 and 8.

As the arrangements of an MFP 100 and information processing apparatus 200 of the second embodiment, the same arrangements as explained with reference to FIGS. 1 and 2 can be used, so an explanation thereof will be omitted.

Also, as the arrangement of a polling application which operates on the information processing apparatus 200 and monitors the state of the MFP 100 and the arrangement of a polling setting information table, the same arrangements as explained with reference to FIGS. 3 and 4 can be used, so an explanation thereof will be omitted.

Figure 7:
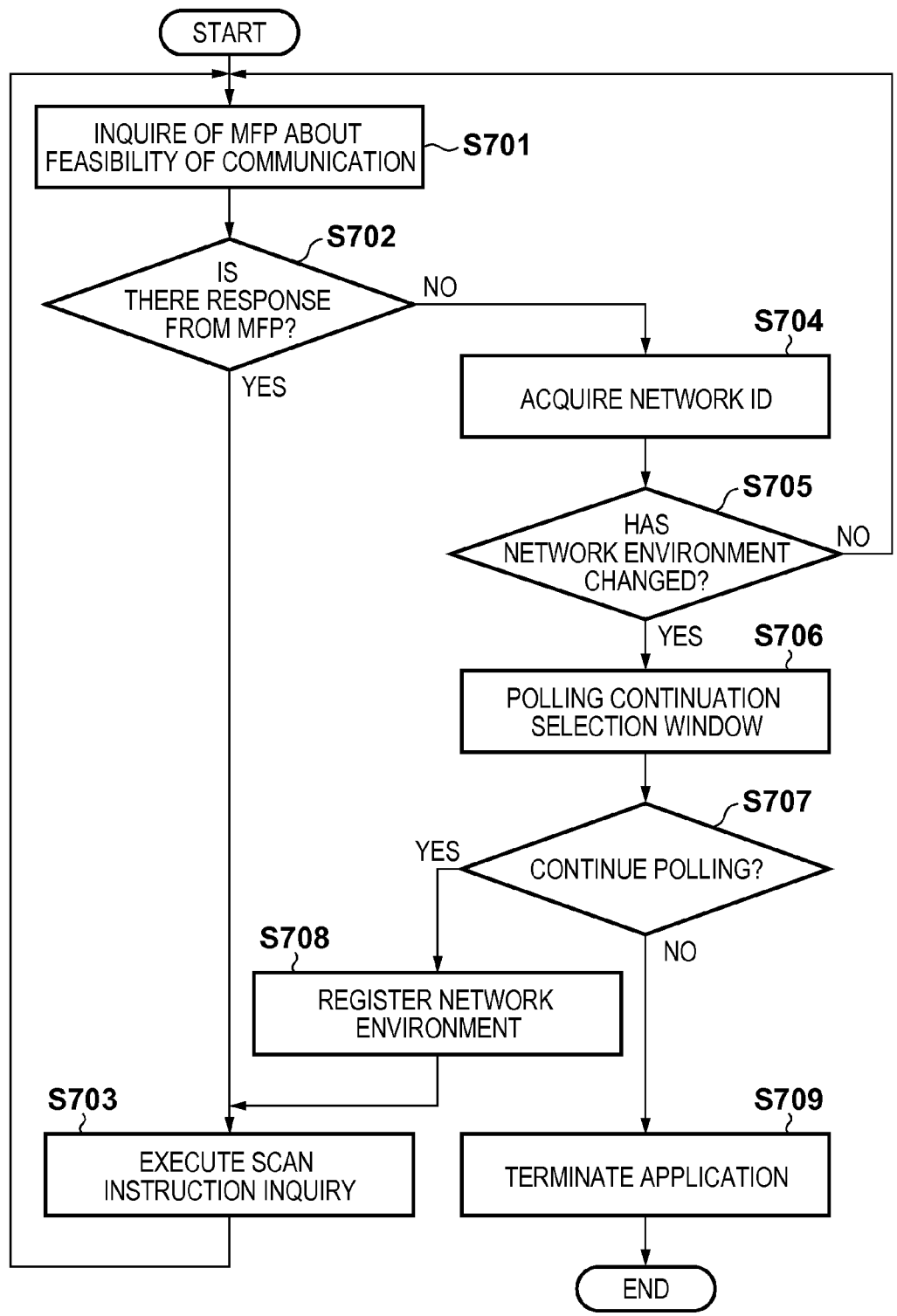
FIG. 7 is a flowchart showing a polling process of the second embodiment.

FIG. 7 is a flowchart showing the processing of polling control which the information processing apparatus 200 performs on the MFP 100. This flowchart shows the procedure of processing performed by a CPU 201 by loading a program of a polling application 300 into a memory 204, and executing the program. Assume that processing for confirming whether a scan instruction is executed in the MFP 100 is performed in this embodiment as well.

Steps S701 to S705 shown in FIG. 7 are the same as steps S501 to S505 shown in FIG. 5, so an explanation thereof will be omitted.

If it is determined in step S705 that the network IDs are different, that is, the network environment has changed (YES in step S705), the process advances to step S706, and a polling control module 302 causes a display unit 205 to display a polling continuation selection window 800 shown in FIG. 8.

FIG. 8 is a confirmation window for inquiring of the user whether to continue or stop polling when it is determined that the network environment has changed. The polling continuation selection window 800 as this confirmation window has a YES button 801 and NO button 802. When the user operates one of these buttons, the window is closed, and the process advances to the next step. Polling is continued if the YES button 801 is operated (polling continuation is designated), and stopped if the NO button 802 is operated (polling stop is designated). Note that it is also possible to temporarily stop polling until the user operates one of these buttons.

In step S707, the polling control module 302 determines whether to continue polling. If the YES button 801 is operated in step S706, the polling control module 302 determines the continuation of polling (YES in step S707). In step S708, the polling control module 302 updates a network ID 402 already registered in a polling setting information table 400 to the network ID acquired in step S704, and advances to step S703. That is, the polling control module 302 determines that the present network environment of the information processing apparatus 200 is the network environment for polling the MFP 100, and registers the present network environment.

On the other hand, if it is determined that the network IDs are the same, that is, the network environment hasn't changed (NO in step S705), the process returns to step S701. By taking account of an increase in network traffic or the load of the MFP 100, the process may also return to step S701 after an interval of (after waiting for) a predetermined time (for example, about 20 sec) in this embodiment as well.

Note that a sequence chart corresponding to the flowchart shown in FIG. 7 is the same as FIG. 6 of the first embodiment, except for the processes in steps S705 to S708, for example, display control for the polling continuation selection window 800, and control based on the determination of a user's instruction corresponding to the display control, are performed after S614.

In the second embodiment as has been explained above, when the information processing apparatus 200 is connected to a network environment different from a network environment in which the information processing apparatus 200 is connected to the MFP 100, whether to continue polling can be determined in accordance with selection by the user. By thus providing the user with an opportunity of selecting continuation/stop of polling, it is possible to stop polling as needed and suppress useless network traffic.

In addition, when connecting the MFP 100 to the changed network environment, polling can be continued by the user by selecting continuation in the polling continuation selection window 800. Therefore, flexible control can be performed even when the network connection destination of the MFP 100 is changed. For example, it is possible to prevent the inconvenience that polling is stopped when the information processing apparatus 200 becomes temporarily incommunicable, and is not executed when the information processing apparatus 200 becomes communicable after that.

Third Embodiment

In the third embodiment, a change in network environment is monitored when the user operates the NO button 802 in the window shown in FIG. 8 in the process of the second embodiment. When the network environment has returned to the initial environment as a polling target, the polling process is automatically restored. The third embodiment will be explained in detail below with reference to FIG. 9.

As the arrangements of an MFP 100 and information processing apparatus 200 of the third embodiment, the same arrangements as explained with reference to FIGS. 1 and 2 can be used, so an explanation thereof will be omitted.

Also, as the arrangement of a polling application which operates on the information processing apparatus 200 and monitors the state of the MFP 100 and the arrangement of a polling setting information table, the same arrangements as explained with reference to FIGS. 3 and 4 can be used, so an explanation thereof will be omitted.

Furthermore, as the arrangement of the polling continuation selection window, the same arrangement as explained with reference to FIG. 8 can be used, so an explanation thereof will be omitted.

Figure 9:
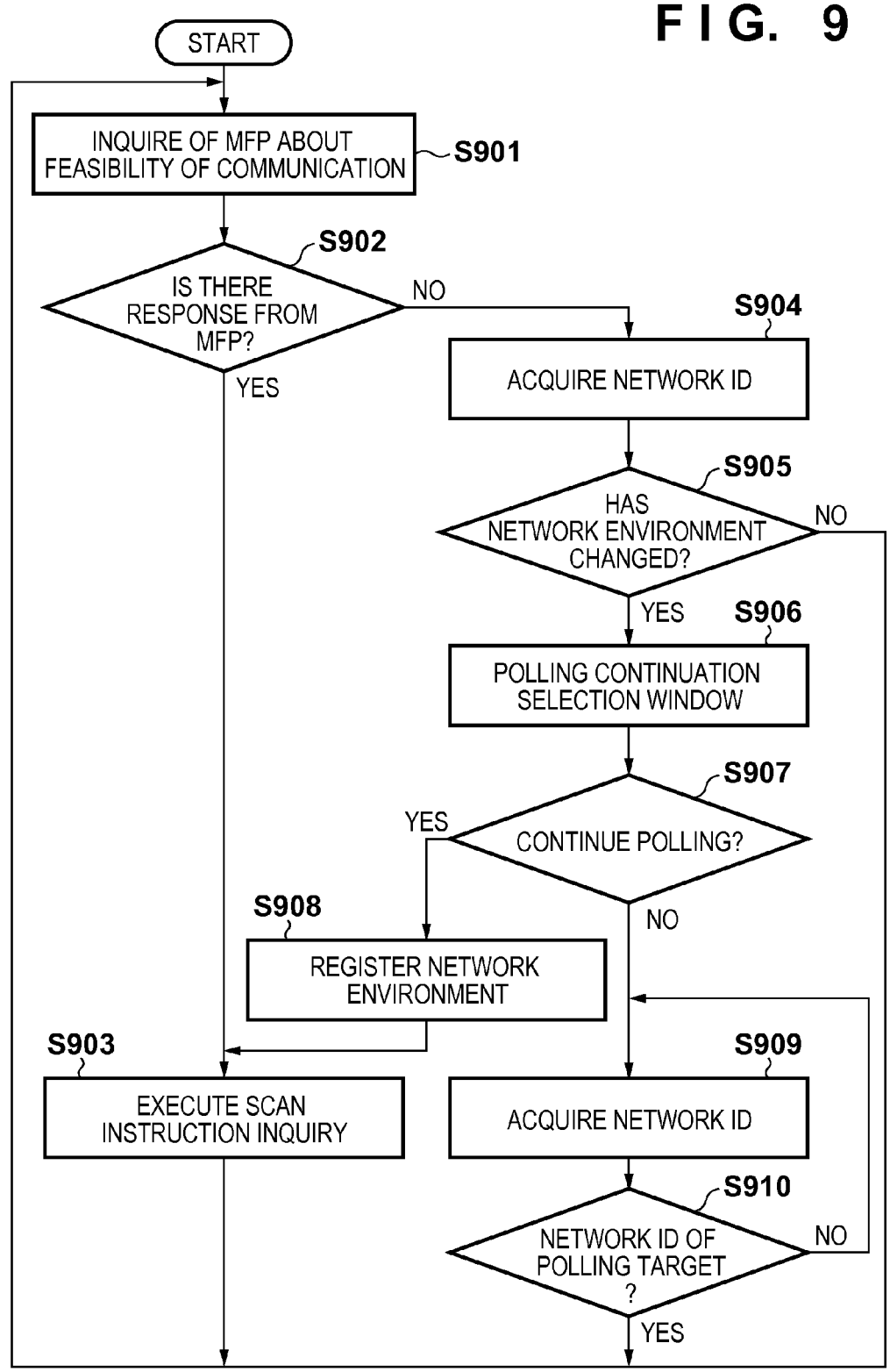
FIG. 9 is a flowchart showing a polling process of the third embodiment.

FIG. 9 is a flowchart showing the processing of polling control which the information processing apparatus 200 performs on the MFP 100. This flowchart shows the procedure of processing performed by a CPU 201 by loading a program of a polling application 300 into a memory 204, and executing the program. Assume that processing for confirming whether a scan instruction is executed in the MFP 100 is performed in this embodiment as well.

Steps S901 to S908 shown in FIG. 9 are the same as steps S701 to S708 shown in FIG. 7, so an explanation thereof will be omitted.

If the NO button 802 is operated in step S906, the stop of polling is determined (NO in step S907). In this case, the process advances to step S909, and a network environment check module 303 acquires a network ID corresponding to a network across which the information processing apparatus 200 is presently performing communication via a network service 305.

In step S910, the network environment check module 303 compares the network ID (third network environment information) acquired in step S909 with a network ID 402 (first network environment information) corresponding to the MFP 100 as a polling destination. Based on the comparison result, the network environment check module 303 determines whether the network IDs are the same, that is, whether the acquired network ID is the network ID of the polling target. If it is determined that the network IDs are different, that is, the present network environment is different from the network environment of the polling target (NO in step S910), the process returns to step S909. In this case, the process may also return to step S909 after an internal of (after waiting for) a predetermined time (for example, about 1 min). On the other hand, if it is determined that the network IDs are the same, that is, the present network environment is the network environment of the polling target (YES in step S910), the process returns to step S901. That is, after polling for the MFP 100 is stopped, polling for the MFP 100 is resumed if the communication environment of the information processing apparatus 200 becomes the communication environment for polling the MFP 100.

In the third embodiment as has been explained above, polling can automatically be resumed when the information processing apparatus 200 reconnects to the network environment in which the information processing apparatus 200 has connected to the MFP 100, in addition to the effect of the second embodiment. Also, in this embodiment, when polling stop is designated for the inquiry in the window shown in FIG. 8, whether the apparatus has returned to the network environment of the polling target is monitored. However, the present invention is not limited to this. It is also possible to monitor whether the apparatus has returned to the network environment of the polling target, after polling is automatically stopped as in the first embodiment.

Fourth Embodiment

In the above embodiment, an example in which the information processing apparatus 200 causes the polling application 300 to poll the presence/absence of a scan instruction in the MFP 100 has been explained. However, information to be polled is not limited to this. Polling is similarly applicable to execution instructions for other functions (for example, the printer function and copy function) of the MFP 100, and to the acquisition of an arbitrary information or state of the MFP 100. When the information processing apparatus 200 detects an execution instruction for the printer function in the MFP 100, the information processing apparatus 200 transmits its own image data as a printing target to the MFP 100, and causes the printer unit 101 to print an image based on the image data. When the information processing apparatus 200 detects an execution instruction for the copy function in the MFP 100, the information processing apparatus 200 causes the scanner unit 102 to read an original (as in the above-described embodiments), and receives image data obtained by the read. Subsequently, the information processing apparatus 200 performs predetermined processing on the image data, transmits the processed image data to the MFP 100, and causes the printer unit 101 to print an image based on the image data.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-220481, filed Oct. 23, 2013, which is hereby incorporated by reference herein in its entirety.

What is claimed is:

1. An information processing apparatus for polling a peripheral apparatus, the information processing apparatus comprising:
   (a) an inquiring unit configured to make a first inquiry to the peripheral apparatus about the feasibility of communication;
   (b) an acquiring unit configured to acquire communication information for specifying a present communication environment of the information processing apparatus if there is no response to the first inquiry from the peripheral apparatus;
   (c) a determination unit configured to determine whether a present communication environment of the information processing apparatus is different from a communication environment for polling the peripheral apparatus based on the communication information; and
   (d) a stopping unit configured to stop polling the peripheral apparatus in response to the determination unit determining that the present communication environment is different from the communication environment for polling the peripheral apparatus,
   wherein the stopping unit does not stop polling the peripheral apparatus on a condition that the determination unit determines that the present communication environment is not different from the communication environment for polling the peripheral apparatus, and
   wherein a processor is configured to perform a functionality of the inquiring unit, the acquiring unit, the determination unit, and the stopping unit.

2. The information processing apparatus according to claim 1, further comprising:
   a management unit configured to manage (1) network environment information about a network to be used for communication between the information processing apparatus and the peripheral apparatus and (2) apparatus information about the peripheral apparatus, by associating the pieces of information with each other,
   wherein the determination unit determines whether the present communication environment is different from the communication environment for polling the peripheral apparatus based on the communication information and the network environment information managed by the management unit, and
   wherein the processor is configured to perform a functionality of the management unit.

3. The information processing apparatus according to claim 1, further comprising:
   a second inquiry unit configured to make a second inquiry to a user whether to continue or stop polling the peripheral apparatus before the stopping unit stops polling the peripheral apparatus, in response to the determination unit determining that the present communication environment is different from the communication environment for polling the peripheral apparatus,
   wherein the stopping unit stops polling the peripheral apparatus in response to an instruction to stop polling the peripheral apparatus, the instruction being in response to the second inquiry,
   wherein the processor is configured to perform a functionality of the second inquiry unit.

4. The information processing apparatus according to claim 3, further comprising:
   a decision unit configured to decide to use the present communication environment of the information processing apparatus as the communication environment for polling the peripheral apparatus, in response to an instruction to continue polling the peripheral apparatus, the instruction being in response to the second inquiry,
   wherein the processor is configured to perform a functionality of the decision unit.

5. The information processing apparatus according to claim 1, further comprising:
   a resume unit configured to resume polling the peripheral apparatus after polling the peripheral apparatus is stopped by the stopping unit, in response to the present communication environment of the information processing apparatus, which is determined by the determination unit, being the communication environment for polling the peripheral apparatus,
   wherein the processor is configured to perform a functionality of the resume unit.

6. The information processing apparatus according to claim 1, wherein the peripheral apparatus comprises a reading apparatus which reads an image of an original, and
   wherein the information processing apparatus detects a read instruction executed in the reading apparatus by polling the reading apparatus.

7. A control method of an information processing apparatus for polling a peripheral apparatus, the control method comprising:
   making a first inquiry to the peripheral apparatus about the feasibility of communication;

acquiring communication information for specifying a present communication environment of the information processing apparatus if there is no response to the first inquiry from the peripheral apparatus;
determining whether a present communication environment of the information processing apparatus is different from a communication environment for polling the peripheral apparatus based on the communication information; and
stopping polling the peripheral apparatus in response to it being determined that the present communication environment is different from the communication environment for polling the peripheral apparatus,
wherein polling the peripheral apparatus is not stopped on a condition that it is determined that that the present communication environment is not different from the communication environment for polling the peripheral apparatus.

8. The control method according to claim 7, further comprising:
managing (1) network environment information about a network to be used for communication between the information processing apparatus and the peripheral apparatus and (2) apparatus information about the peripheral apparatus, by associating the pieces of information with each other,
wherein the determining comprises determining whether the present communication environment is different from the communication environment for polling the peripheral apparatus based on the communication information and the network environment information managed in the managing.

9. The control method according to claim 7, further comprising making a second inquiry to a user whether to continue or stop polling the peripheral apparatus before polling the peripheral apparatus is stopped, in response to it being determined that the present communication environment is different from the communication environment for polling the peripheral apparatus before the stopping unit stops polling the peripheral apparatus,
wherein the stopping comprises stopping polling the peripheral apparatus in response to an instruction to stop polling the peripheral apparatus, the instruction being in response to the second inquiry.

10. The control method according to claim 9, further comprising deciding the present communication environment of the information processing apparatus as the communication environment for polling the peripheral apparatus, in response to an instruction to continue polling the peripheral apparatus, the instruction being in response to the second inquiry.

11. The control method according to claim 7, further comprising resuming polling the peripheral apparatus after polling the peripheral apparatus is stopped in the stopping step, in response to the present communication environment of the information processing apparatus, which is determined in the determination, being the communication environment for polling the peripheral apparatus.

12. The control method according to claim 7, wherein the peripheral apparatus comprises a reading apparatus which reads an image of an original, and
wherein the information processing apparatus detects a read instruction executed in the reading apparatus by polling the reading apparatus.

13. A non-transitory computer-readable storage medium storing a program for causing a computer to control an information processing apparatus for polling a peripheral apparatus, the program causing the computer to function as units comprising:
an inquiring unit configured to make a first inquiry to the peripheral apparatus about the feasibility of communication;
an acquiring unit configured to acquire communication information for specifying a present communication environment of the information processing apparatus if there is no response to the first inquiry from the peripheral apparatus;
a determination unit configured to determine whether a present communication environment of the information processing apparatus is different from a communication environment for polling the peripheral apparatus based on the communication information; and
a stopping unit configured to stop polling the peripheral apparatus in response to the determination unit determining that the present communication environment is different from the communication environment for polling the peripheral apparatus,
wherein the stopping unit does not stop polling the peripheral apparatus on a condition that the determination unit determines that the present communication environment is not different from the communication environment for polling the peripheral apparatus.

14. The non-transitory computer-readable storage medium according to claim 13, wherein the program further causes the computer to function as a management unit configured to manage (1) network environment information about a network to be used for communication between the information processing apparatus and the peripheral apparatus and (2) apparatus information about the peripheral apparatus, by associating the pieces of information with each other, and
wherein the determination unit determines whether the present communication environment is different from the communication environment for polling the peripheral apparatus based on the communication information and the network environment information managed by the management unit.

15. The non-transitory computer-readable storage medium according to claim 13, wherein the program further causes the computer to function as a second inquiry unit configured to make a second inquiry to a user whether to continue or stop polling the peripheral apparatus before the stopping unit stops polling the peripheral apparatus, in response to the communication environment determined by the determination unit being different from the communication environment for polling the peripheral apparatus, and
wherein the stopping unit stops polling the peripheral apparatus in response to an instruction to stop polling the peripheral apparatus, the instruction being in response to the second inquiry.

16. The non-transitory computer-readable storage medium according to claim 15, wherein the program further causes the computer to function as a decision unit configured to decide to use a present communication environment of the information processing apparatus as the communication environment for polling the peripheral apparatus, in response to an instruction to continue polling the peripheral apparatus, the instruction being in response to the second inquiry.

17. The non-transitory computer-readable storage medium according to claim 13, wherein the program further causes the computer to function as a resume unit configured to resume polling the peripheral apparatus after polling the peripheral apparatus is stopped by the stopping unit, in response to the communication environment of the information processing apparatus, which is determined by the determination unit, being the communication environment for polling the peripheral apparatus.

18. The non-transitory computer-readable storage medium according to claim 13, wherein the peripheral apparatus comprises a reading apparatus which reads an image of an original, and wherein the information processing apparatus detects a read instruction executed in the reading apparatus by polling the reading apparatus.

* * * * *